United States Patent
Tanaka et al.

(10) Patent No.: US 9,222,545 B2
(45) Date of Patent: Dec. 29, 2015

(54) SILENT CHAIN AND SILENT CHAIN TRANSMISSION

(71) Applicant: Daido Kogyo Co., Ltd., Ishikawa Pref. (JP)

(72) Inventors: Motoki Tanaka, Ishikawa Pref. (JP); Hiroaki Oku, Ishikawa Pref. (JP)

(73) Assignee: DAIDO KOGYO CO., LTD., Ishikawa Pref. (JP)

( * ) Notice: Subject to any disclaimer, the term of this patent is extended or adjusted under 35 U.S.C. 154(b) by 258 days.

(21) Appl. No.: 14/081,162

(22) Filed: Nov. 15, 2013

(65) Prior Publication Data

US 2014/0141914 A1    May 22, 2014

(30) Foreign Application Priority Data

Nov. 22, 2012  (JP) ................................. 2012-256915

(51) Int. Cl.
*F16G 13/04* (2006.01)
*F16G 13/08* (2006.01)

(52) U.S. Cl.
CPC ................. *F16G 13/04* (2013.01); *F16G 13/08* (2013.01)

(58) Field of Classification Search
CPC ............ F16H 13/04; F16H 13/08; F16H 7/06
USPC .......................................... 474/212, 213, 214
See application file for complete search history.

(56) References Cited

U.S. PATENT DOCUMENTS

| | | | | |
|---|---|---|---|---|
| 4,832,668 A | * | 5/1989 | Ledvina ................... | F16G 13/04 474/155 |
| 5,154,674 A | * | 10/1992 | Avramidis ............... | F16G 13/04 474/214 |
| 5,176,585 A | * | 1/1993 | Novak ..................... | F16G 13/02 474/111 |
| 5,453,059 A | * | 9/1995 | Avramidis ................ | F01L 1/02 474/212 |
| 5,464,374 A | * | 11/1995 | Mott ......................... | F16G 5/18 474/224 |
| 2004/0166978 A1 | * | 8/2004 | Matsuda ................... | F16G 13/04 474/212 |
| 2006/0094551 A1 | * | 5/2006 | Tohara ..................... | F16G 13/04 474/212 |
| 2007/0072719 A1 | * | 3/2007 | Sakamoto ................ | F16G 13/04 474/212 |
| 2007/0161445 A1 | * | 7/2007 | Nagao ...................... | F16G 13/04 474/212 |
| 2010/0304911 A1 | * | 12/2010 | Kabai ....................... | F16G 13/04 474/213 |
| 2013/0203538 A1 | * | 8/2013 | Miyanaga ................ | F16G 13/04 474/213 |

FOREIGN PATENT DOCUMENTS

| | | |
|---|---|---|
| JP | 7-86378 | 9/1995 |
| JP | 2006-132637 | 5/2006 |
| JP | 2007-92850 | 4/2007 |
| JP | 4618846 | 11/2010 |
| JP | 2010-276043 | 12/2010 |

* cited by examiner

*Primary Examiner* — William E Dondero
*Assistant Examiner* — Robert T Reese
(74) *Attorney, Agent, or Firm* — Wenderoth, Lind & Ponack, L.L.P.

(57) ABSTRACT

A back face of each inner link plate of the chain is curved convexly. Heights from a pitch line connecting centers of pin holes of inner and guide link plates to the convex apex portion of the inner link plate and to an apex portion of the guide link plate are equalized. The convex apex portions are brought into contact with a guide face of the chain guide per every pitch and the ear apex portions are brought into contact with the chain guide per every pitch while being shifted by a half pitch from the convex apex portions.

14 Claims, 8 Drawing Sheets

SILENT CHAIN AND SILENT CHAIN TRANSMISSION

BACKGROUND OF THE INVENTION

1. Field of the Invention

The present invention relates to a silent chain suitably used as a timing chain that transmits rotations of a crankshaft to a camshaft in an engine, and more specifically to a silent chain and a silent chain transmission configured such that a back face of the silent chain is in contact with and is guided by a chain guide.

2. Description of Related Art

In general, a silent chain is composed of inner link plates each having a pair of teeth that engage with teeth of a sprocket, guide link plates disposed on both sides of the inner link plates and guide the silent chain such that the silent chain does not deviate from the sprocket, and pins fixed to the guide link plates and flexibly connecting the inner link plates. When the silent chain is used as a timing chain in particular, a back face of the silent chain is in slidable contact with a chain guide such that the silent chain is guided while receiving a predetermined tension and while preventing vibrations thereof.

Conventionally, there is known a silent chain configured such that lengths from a line connecting centers of pin holes to back faces of an inner link plate and of a guide link plate are equalized. It is also proposed to use a low rigid guide link plate having a crotch portion as a guide link plate and, in consideration of a clearance between a pin and a pin hole of an inner link plate, to set a length from a line connecting centers of the pin holes to a back face of an inner link plate such that a value of the length is equal to or greater than a value to which ½ of the clearance is added to a length from the line connecting the centers of the pin holes to a back face of a guide link plate to which the pin is tightly fitted as disclosed in Japanese Patent No. 4618846.

Each inner link plate of Japanese Patent No. 4618846 has the back face which is a straight flat face. It is noted that the back face is a part of the inner link plate between lines orthogonal to the straight line connecting centers of the both pin holes and passing through the centers of the pin holes. This arrangement makes it possible to guide the whole back face of each inner link plate in contact with the chain guide, to prevent back faces (ear portions) of the guide link plate having the crotch portion from strongly abutting against with small contact faces, and to prevent edge-like abrasion mark from being made on a guide face end portion of the chain guide.

However, the silent chain described above increases a friction loss because the whole back face of the inner link plate of the silent chain is in slidable contact with the chain guide. Still further, some guide link plates cause a gap between the back face thereof and the guide face of the chain guide, destabilizing behaviors of the chain, e.g., causing vibrations in width and twisting directions. Such destabilized behaviors of the chain may cause improper engagement of the inner link plates with a sprocket, generate engagement noise and drop transmission efficiency of the chain.

SUMMARY OF THE INVENTION

The present invention provides a silent chain that is capable of being stably guided while reducing an area of contact between a back face of a link plate and a chain guide. According to an aspect of the present invention, a silent chain including inner link plates each having a pair of teeth, a pair of pin holes, and a back face curved convexly, the inner link plates being arrayed in widthwise and longitudinal directions of the chain, guide link plates each having a pin hole and an abut portion formed on a back face thereof at part corresponding to the pin hole, the guide link plates being disposed at both outer sides of the inner link plates arrayed in the width direction and pins retained by the pin holes of the guide link plates and inserted through the pin holes of the inner link plates such that the inner link plates adjacent in the longitudinal direction are articulably and endlessly connected, wherein a length from a line connecting centers of the pin holes to a convex apex portion of the back face of each inner link plate is substantially equal to a length from the line to an apex portion of the abut portion of each guide link plate.

Further features of the present invention will become apparent from the following description of exemplary embodiments with reference to the attached drawings.

DESCRIPTION OF THE EMBODIMENTS

Figure 1A:
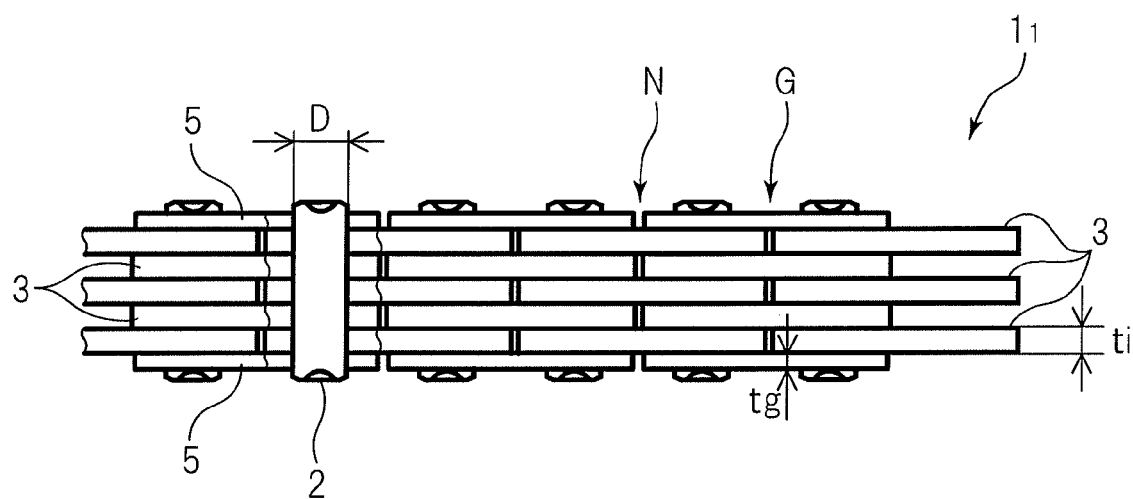
FIG. 1A is a plan view of a silent chain of a first embodiment of the invention.
Figure 1B:
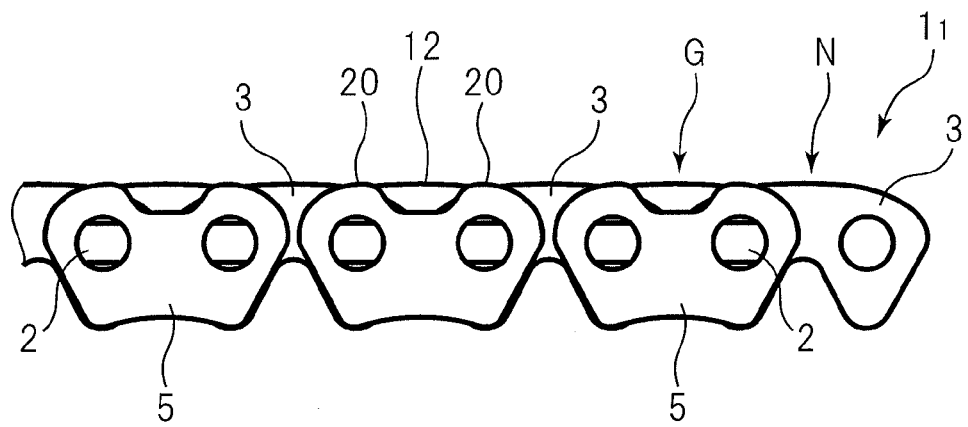
FIG. 1B is a front view of the silent chain shown in FIG. 1A.

Embodiments of the present invention will be explained below with reference to the drawings. As shown in FIGS. 1A and 1B, a silent chain $1_1$ of a first embodiment is configured to be an endless chain by alternately linking inner link plates 3 with each other by pins 2 and is provided with guide link plates 5 on both outermost sides of each link row (transverse row) of the inner link plates 3. The pins 2 are fixed to the guide link plates 5 on the both sides by means of caulking or tight fitting such that each guide link row G composed of the guide link plates and the inner link plates does not rotate with respect to the pins 2. The inner link plates 3 in each non-guide link row N adjacent to the guide link row rotate with respect to the pins 2, so that the silent chain $1_1$ can flexibly bend.

Figure 2A:
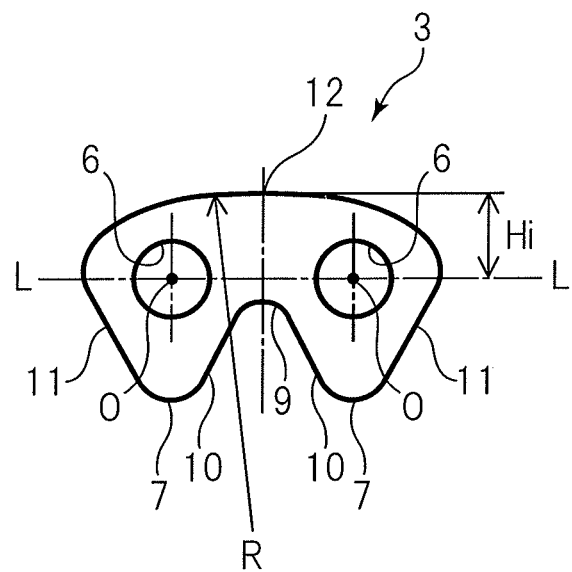
FIG. 2A is a front view of an inner link plate.

As shown in FIG. 2A, the inner link plate 3 has a pair of right and left pin holes 6 and a pair of tooth portions 7 located on a front side, i.e., an inner diameter side (of the endless chain), of a line L-L (referred to as a 'pitch line' hereinafter) connecting centers O of these pin holes 6. The tooth portions 7 are provided with inner flank faces 10 formed on a side of a crotch portion 9 between the tooth portions 7 and outer flank faces 11 formed on outer sides of the respective tooth portions 7. The tooth portions 7 are configured to have an engage mechanism by which the inner and outer flank faces 10 and 11 abut against teeth of a sprocket. The engage mechanism is configured, for example, such that the inner flank face 10 abuts against the sprocket tooth first and after advancing the engagement, the outer flank face 11 seats on the sprocket tooth (inner flank abutting and outer flank seating mechanism).

A back face side, i.e., an outer diameter side of the pitch line of the inner link plate 3 described above is formed so as to be curved with a predetermined radius R and hence, a center portion thereof between the right and left pin holes 6 is convexed and is highest. A length (height) Hi from the pitch line L-L to the highest center convex apex portion 12 is preset to be a predetermined value. A radius of curvature R of the back face is preferable to be set between 3P and 16P, where P is a pitch or a distance between the pin holes (see FIG. 4). The curved side end face including the convex apex portion 12 is ground and polished in high definition, i.e., is fine-finished to be 0.05 to 0.5 of Ra for example.

Figure 2B:
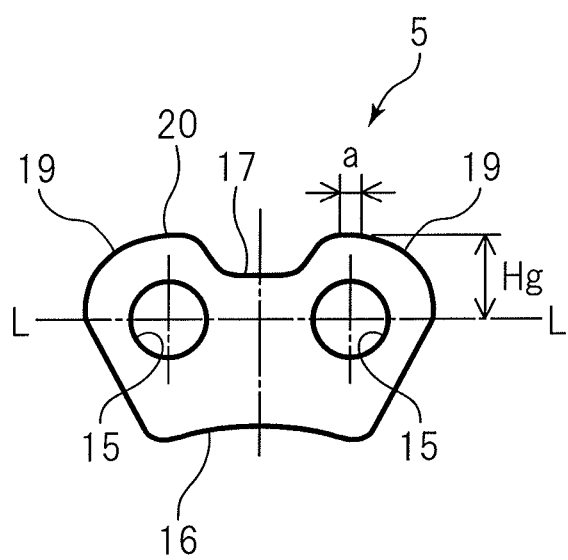
FIG. 2B is a front view of a guide link plate of the first embodiment.

As shown in FIG. 2B, the guide link plate 5 has a pair of pin holes 15 and is formed such that an inner diameter side (front side) of a pitch line L-L connecting centers of the pin holes 15 abuts against a side face of the sprocket teeth and blocks lateral shift of the silent chain $1_1$. An inner diameter end of the guide link plate 5 is formed into a concave curve portion 16. The guide link plate 5 is a low rigid guide link plate having a back face on an outer diameter side of the pitch line L-L with a shallow crotch portion 17 formed at a center part of the back face and ear portions (abut portion) 19 formed at positions corresponding to outer diameter sides, i.e., back face side, of the pin holes 15 and before and after the crotch portion 17 in terms of a chain traveling direction. While each ear portion is curved as a whole, an ear apex portion 20 separated most from the pitch line L-L is formed into a straight flat face in parallel with the pitch line L-L. The flat face (ear apex portion) 20 is located at a position corresponding to the pin hole 15, and a length (a) of the flat face (ear apex portion) 20 is smaller than a diameter (D) of the pin 2 and is preferably within a range from 0.1 D to 0.4 D with respect to the pin diameter D.

A length (height) Hg from the pitch line L-L to the flat face (apex portion) 20 of the ear portion 19 is preset such that it is substantially equal to the length (height) Hi from the pitch line L-L to the convex apex portion 12 on the back of the inner link plate 3, i.e., Hi=Hg. It is noted that the phrase 'substantially equal' means that the back faces of the inner link plate 3 and the guide link plate 5 come into contact with the chain guide together when they come into contact with the chain guide, and a difference around a half of a clearance caused by a loose fit relationship between the pin hole 6 of the inner link plate 3 and the pin 2 is included within a substantially equal range.

While the flat face 20 of the ear portion is also ground, polished, and finished in high definition, a finishing accuracy thereof needs not be so high as that of the back face 12 of the inner link plate 3 (surface roughness can be low), and the surface roughness thereof may be of fine finishing around 0.8 to 2.0 of Ra.

As shown in FIG. 1A, a plate thickness tg of the guide link plate 5 of the silent chain $1_1$ is set to be thinner than a plate thickness ti of the inner link plate 3 (tg<ti). The thickness tg of the guide link plate 5 is preferable to be within a range of 0.3 to 0.7 with respect to the thickness ti of the inner link plate 3 (tg=0.3ti to 0.7ti) for example. A preload operation of aligning the pitch of the silent chain is carried out after completing assembly thereof by pulling the silent chain $1_1$ by a tension greater than a yield load and by absorbing initial elongation. While a number of link plates of the guide link row G is greater than that of the non-guide link row N by one link plate, the difference of thickness of the plates together with the shape of the low rigid guide link plate 5 having the crotch portion 17 substantially equalizes stress applied to all of the inner link plates 3 and enable to improve the accuracy of the pitch and to reduce degradation of the accuracy of the pitch by use thereof.

Figure 3:
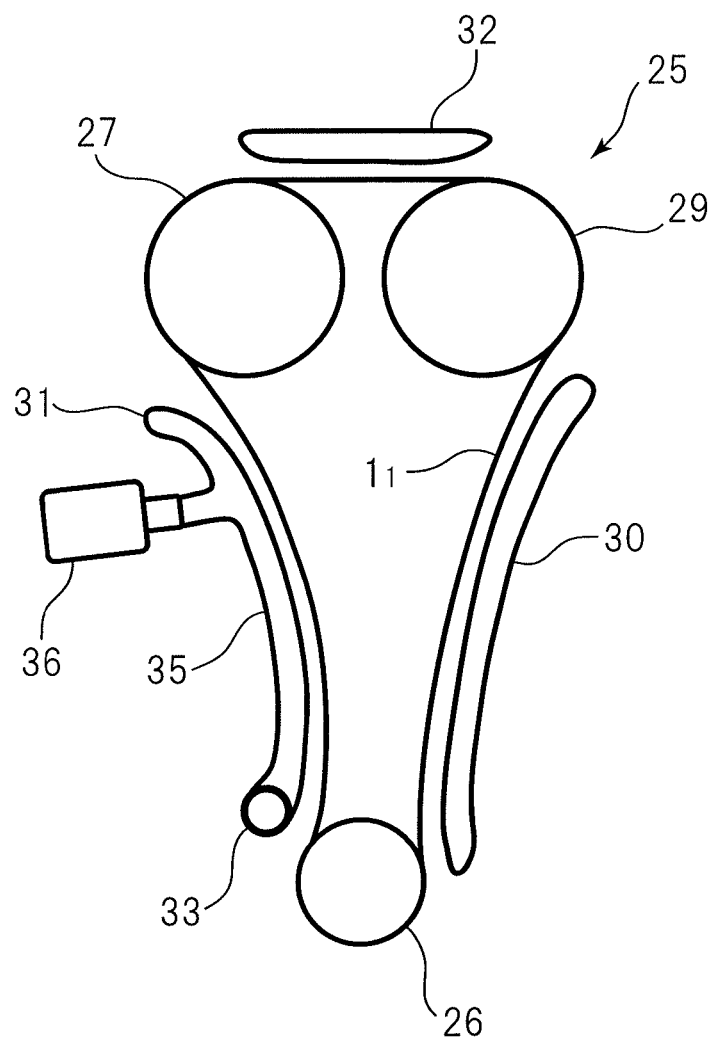
FIG. 3 is a front view schematically showing a transmission using the silent chain.

The silent chain $1_1$ described above is suitably applicable to a timing chain of an engine. As shown in FIG. 3, the silent chain transmission 25 is composed of a driving sprocket 26 fixed to a crankshaft, driven sprockets 27 and 29 fixed respectively to two camshafts, and the silent chain $1_1$ wrapped around the driving sprocket 26 and the driven sprockets 27 and 29. Provided on the back sides of the silent chain $1_1$ are chain guides 30, 31 and 32 that guide the chain in slidable contact. The chain guide 30 located on tension sides between the driving sprocket 26 and the driven sprocket 29 and the chain guide 32 located between the two driven sprockets 27 and 29 include rail-like shoe members mounted to stationary members. The loose side chain guide 31 between the driving sprocket 26 and the driven sprocket 27 serves as a chain tensioner. The chain tensioner 31 includes a shoe member 35 that is in slidable contact with the back face of the chain and is oscillably supported by a pivot pin 33, and a regulate member 36 that regulates the shoe member 35 by hydraulic pressure or a spring corresponding to a tension of the chain.

The silent chain transmission 25 decelerates rotations of the driving sprocket 26 driven by the crankshaft to a half and transmits it to the driven sprockets 27 and 29 to drive the two camshafts with adequate timing. At this time, the back face of the chain is caused to travel in slidable contact with the chain guides 30, 31 and 32 through an intermediary of oil to stabilize behavior of the chain by preventing vibrations or the like of the silent chain $1_1$. The slidable contact of the chain with the chain guides must be adequately controlled in order to stabilize the behavior of the silent chain $1_1$, and it is required to be able to reduce a friction loss that affects fuel efficiency of a vehicle. The chain is also required to be highly durable and reliable because the chain is not replaced in principle until when a life of the vehicle comes.

Figure 4:
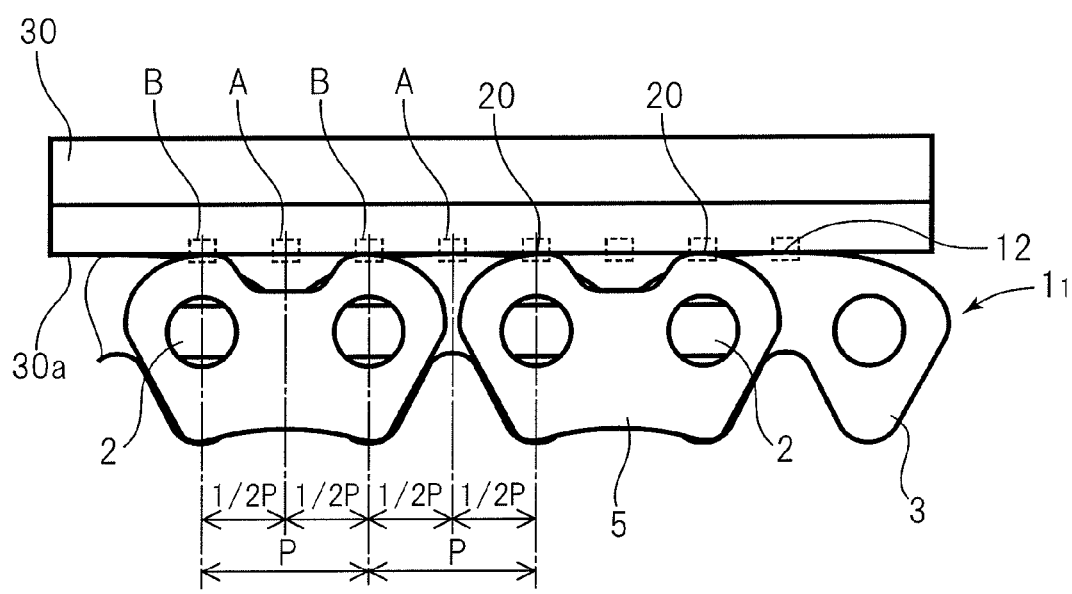
FIG. 4 is a front view illustrating a contact condition of the silent chain and a chain guide of the invention.

FIG. 4 illustrates a condition in which the silent chain $1_1$ is in slidable contact with the chain guide 30 (31, 32). It is noted that while the chain guide is curved and is not straight strictly speaking, a curvature of the curve thereof is very small with respect to a pitch of the chain, and it is a minor difference of design that is practically negligible to consider it as a straight line. Still further, while the chain guide 30 on the tension side is typically illustrated as the chain guide in FIG. 4, the same applies to the other chain guides 31 and 32. In the silent chain $1_1$, the inner link plate 3 comes into contact with a guide face 30*a* of the chain guide 30 through the convex apex portion 12 thereof and the guide link plate through the ear apex portion 20 thereof, respectively. While there is one convex apex portion 12 in each inner link plate 3 and is located at the center of one pitch P between the pins 2, there is one contact portion A of the convex apex portion 12 per each pitch P at the center part of each pitch P when viewed from the side because the inner link plates 3 in the guide link rows G and the non-guide link rows N are linked alternately. Each guide link plate 5 has the two ear apex portions 20 above the respective pins 2 only in the guide link row G, so that there is one contact portion B of the ear apex portion 20 per each pitch P above each pin (pitch).

Accordingly, in the entire silent chain $1_1$, the contact portions A and B are located per ½ pitch from each other and disposed equidistantly (½P) when viewed from the side. An area of the contact portion A of the convex apex portion 12 is determined by the thickness ti of the inner link plate 3 and the radius R of the curved back face, and the smaller the radius R, the smaller the area is. Abrasion of the chain guide 30 increases if the R is equal to or smaller than R=3P, and a friction area increases and it is unable to obtain a desirable effect of reduction of friction loss if the radius R is equal to or greater than R=16P. An area of a contact portion B of the ear apex portion 20 is determined by the thickness tg of the guide link plate 5 and the length (range) (a) of the flat face 20. It is preferable to set the length (a) to be equal to or smaller than 0.4 D, i.e., a=0.4 D, because it is possible to obtain a greater effect of the reduction of friction loss as compared to those whose length (a) is greater than that, and abrasion of the chain guide increases if the length (a) is equal to or smaller than 0.1 D, i.e., a=0.1 D. The silent chain $1_1$ of the present embodiment is preset within ranges in which advance of the abrasion of the chain guide 30 is kept within a permissible range and a desirable effect of the reduction of friction loss can be obtained. It is also effective to reduce the friction loss to enhance (improve) the precision of roughness of the back face of the inner link plates 3 whose number of contacts (A) is large and which are thick.

The contact portions B of the ear apex portion 20 of the guide link plate 5 are located on the widthwise both ends of the silent chain $1_1$ per every pitch P while shifting by a half pitch with respect to the contact portions A of the inner link plates 3, so that it is possible to effectively suppress vibrations of the chain in the widthwise and twist directions and to stabilize the behavior of the silent chain $1_1$. This arrangement enables the silent chain $1_1$ to engage adequately with the sprockets 26, 27 and 29, reduces engage noise, and improves transmission efficiency and durability of the chain.

Figure 5A:
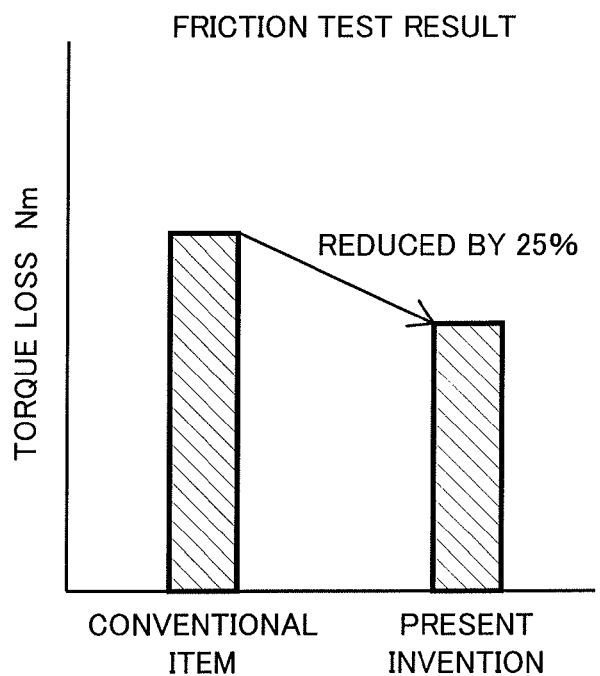
FIG. 5A is a graph showing a result of a friction test of the invention.
Figure 5B:
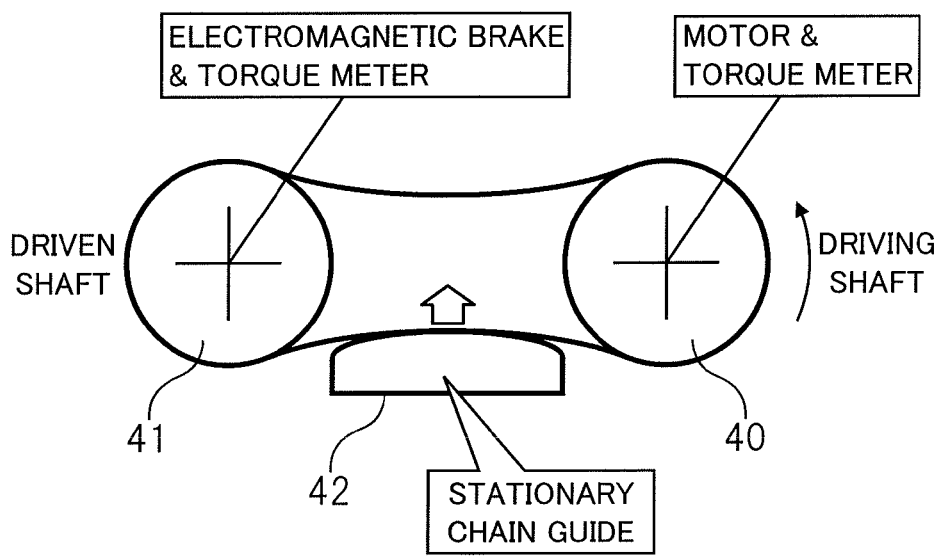
FIG. 5B illustrates a testing apparatus of the friction test.

Next, a performance test of the friction loss of the silent chain will be explained with reference to FIGS. 5A and 5B. As shown in FIG. 5B, a friction loss test system includes a driving sprocket 40 mounted to a driving shaft to which a motor and a torque meter is connected, a driven sprocket 41 mounted to a driven shaft to which an electromagnetic brake and a torque meter are connected, a silent chain wrapped around the driving sprocket 40 and the driven sprocket 41, and a stationary chain guide 42 provided on a tension side of the silent chain to guide a back face of the chain. The driving sprocket 40 is rotated by the motor to rotate the driven sprocket 41 to which a load is applied by the electromagnetic brake through the silent chain. At this time, a sliding resistance acts between the silent chain and the chain guide 42 disposed on the tension side of the chain. Then, a difference of torques of the both shafts by the driving and driven side torque meters. This difference of torques is measured as a friction loss.

The silent chain $1_1$ of the present embodiment is compared with a conventional item of the same size (pitch P=6.35 mm) in which back faces of inner link plates and guide link plates are straight flat faces and are in contact with a chain guide across an entire length thereof when viewed from a side. It is noted that link plates finished in high precision and having the same level of roughness of back face are used. As a result of the test, it was confirmed that the friction loss of the silent chain of the present embodiment was reduced by about 25% as compared to the conventional item as shown in FIG. 5A.

Figure 6A:
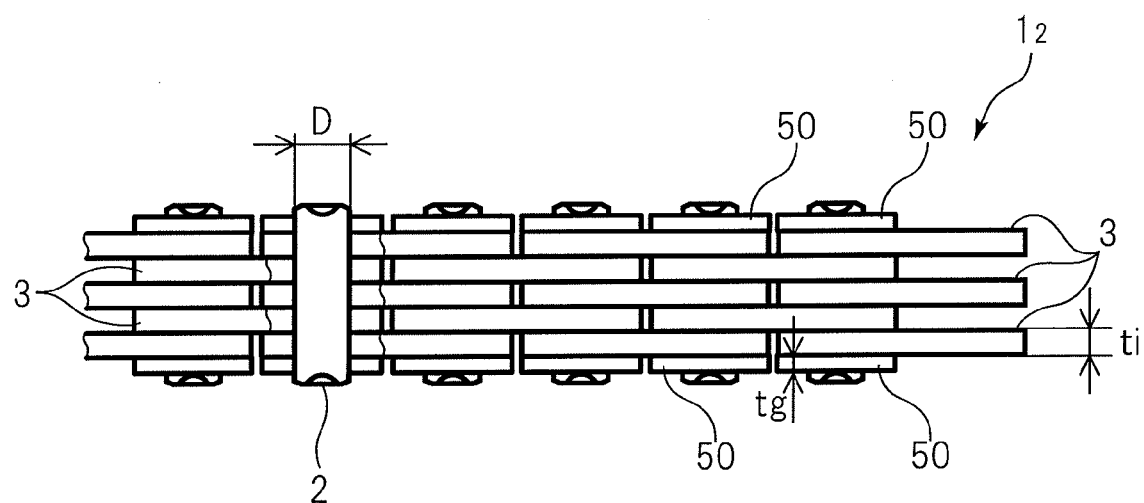
FIG. 6A is a plan view of a silent chain of a second embodiment of the invention.
Figure 6B:
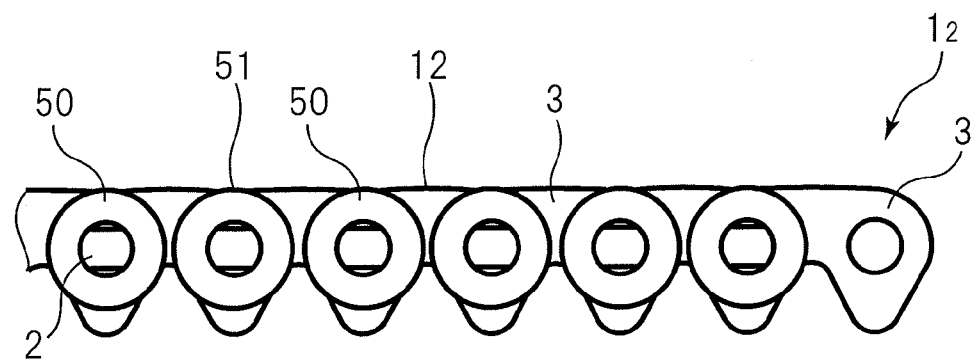
FIG. 6B is a front view of the silent chain shown in FIG. 6A.

Next, a second embodiment of the invention will be explained with reference to FIGS. 6 through 8. It is noted that the present embodiment is what the guide link plates are replaced with washer type guide link plates, and the other members such as the inner link plates 3 are same with those of the first embodiment, so that they will be denoted by the same reference numerals and their explanation will be omitted here. As shown in FIGS. 6A and 6B, the silent chain $1_2$ includes the inner link plates 3 each having a pair of pin holes and alternately connected by the pins 2 inserted through the pin holes, and guide link plates 50 disposed at outermost sides of each widthwise link row of the inner link plates 3 to retain and fix the pin 2. The guide link plate 50 is a ringed washer type plate having only one pin hole 15. Accordingly, the guide link plate 50 is located at a part corresponding to the pin hole 15, and an outer diametric face, i.e., a back face, thereof becomes a back abut portion 51. It is noted that although the washer type guide link plates 50 do not compose any link strictly speaking because each of them corresponds to one pin, they will be also referred to as link plates for convenience sake.

Figure 7A:
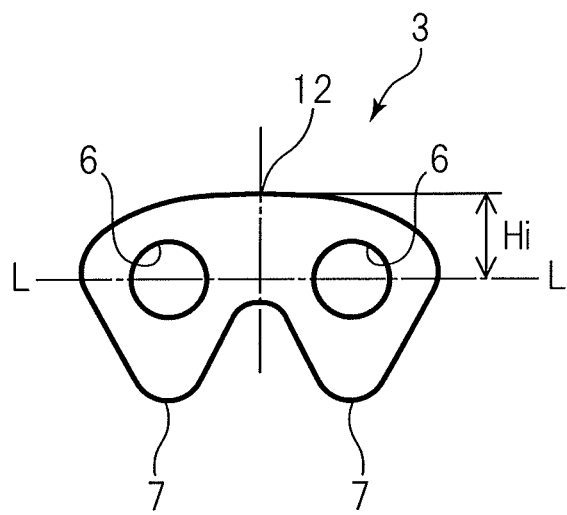
FIG. 7A is a front view of an inner link plate of the second embodiment.
Figure 7B:
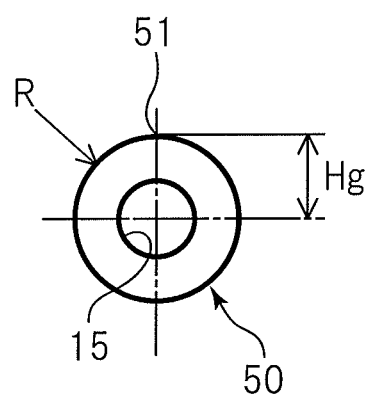
FIG. 7B is a front view of a washer type guide link plate of the other embodiment.

As shown in FIGS. 7A and 7B, a length (height) Hg of the back abut portion 51 of the guide link plate 50 from a pitch line L-L is equal with a length (height) Hi of the convex apex portion 12 on the back face of the inner link plate 3 from the pitch line L-L. That is, the washer type guide link plate 50 has a radius R equal to the lengths Hi and Hg, and the back apex portion 51 thereof becomes an apex portion of the abut portion abutting against a chain guide.

Accordingly, the apex portions of the abut portions 51 of the guide link plates 50 come into contact with the chain guide per every pitch also in the silent chain $1_2$, similarly to the silent chain $1_1$ of the first embodiment when viewed from the side. The convex apex portions 12 of the inner link plates 3 come into contact with the chain guide per every pitch at a center between the apex portions 51 of the abut portions. Accordingly, it is possible to obtain contact portions per every ½ pitch in a longitudinal direction of the chain as a whole.

Figure 8:
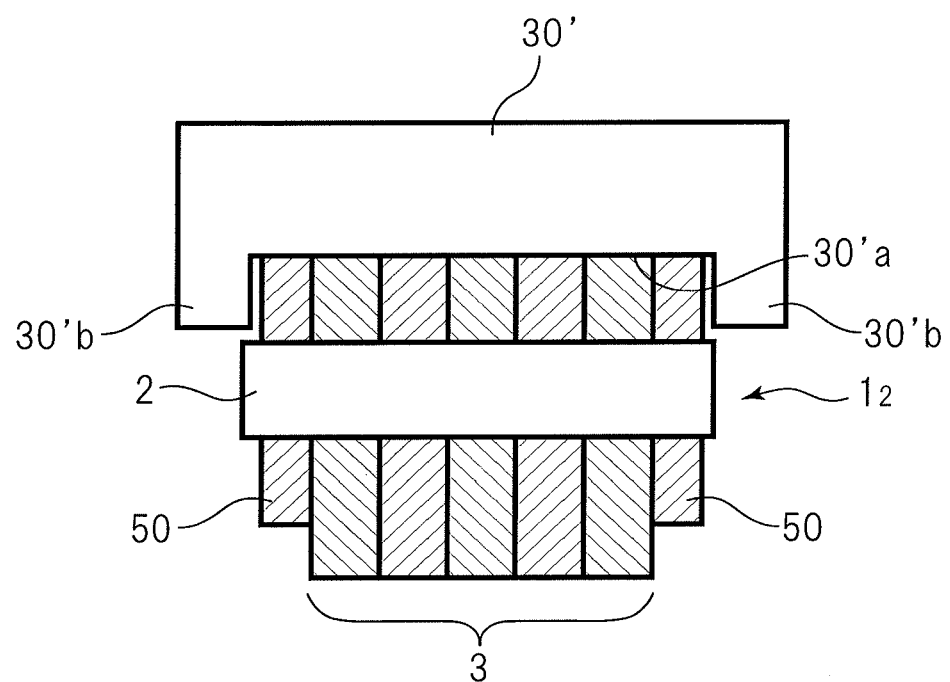
FIG. 8 is a section view illustrating the chain guide.

The washer type guide link plate 50 has less portion that comes into contact with side faces of sprocket teeth and is inferior in terms of a function of leading the chain to the sprocket teeth, so that a flanged chain guide 30' is used as shown in FIG. 8. The chain guide 30' has flange portions 30'b formed at both ends of a slidable contact portion 30'a that is in slidable contact with the back face of the chain so as to protrude toward the inner diameter side. The silent chain $1_2$ is lead to and is adequately engaged with the respective sprockets without vibrating in the transverse direction by the flange portions 30'b.

When the washer type guide link plate 50 abuts strongly against the chain guide, the guide link plate 50 rotates and changes its contact position. This makes it possible to reduce the friction loss of the guide link plate 50 and to delay the advance of abrasion the chain guide. It is noted that although the pin 2 is fixed integrally with the guide link plate 50 by means of tight fit or the like in the present embodiment, it is also possible to arrange such that the pin 2 is connected so as to be retained to the guide link plate 50 and the guide link plate 50 is rotably supported with respect to the pin 2.

As described above, according to the silent chains of the first and second embodiments described above, as the lengths from the pitch line of the pin holes to the convex apex portion of the back face of each inner link plate and to the apex portion of the abut portion of the back face of each guide link plate are equal, the back faces of the inner and guide link plates come into slidable contact with and are guided by the chain guide. That is, while the portions in slidable contact with the chain guide of the inner and guide link plates are parts of the back faces of the plates, they come into contact with the chain guide with less area of contact (point contact). Accordingly, it is possible to reduce a friction loss between the link plates and the chain guide and to improve transmission efficiency of the chain.

Still further, because each of the silent chains is configured such that not only the back face of each inner link plate but also the back face of each guide link plate come into contact with the chain guide, the silent chain is guided by the chain guide across the whole range in the width direction of the silent chain. The abut portions of the back face of the guide link plates are located on the widthwise both ends of the chain corresponding to the pins, so that it is possible to stably guide the chain while preventing vibrations thereof in widthwise and twist directions and hence to reduce the engagement noise and to improve the transmission efficiency of the chain notwithstanding the fact that the area of contact between the chain and the chain guide is reduced.

Still further, the convex apex portion on the back face of the inner link plate is located at the center between the pin holes and the large number of such convex apex portions are arrayed while being shifted alternately with the adjacent convex apex portions in the width direction and per every pitch when viewed from the side. The abut portions on the back face of the guide link plates are arrayed per every pitch at the center between the convex apex portions of the inner link plate viewed from the side and at the widthwise both ends of the inner link plates. Accordingly the convex apex portions and the abut portions come into slidable contact with the chain guide in a well-balanced manner in widthwise and longitudinal directions so that behaviors of the silent chain can be stabilized.

Still further, because the thickness of the guide link plate is thinner than the thickness of the inner link plate, it is possible to lighten the silent chain. In the case in which the guide link plate is formed of the low rigid type plate having the crotch portion on the back side thereof like the silent chain of the first embodiment, it is possible to improve pitch accuracy of inner link plates in a guide row arrayed in the same row with the guide link plates by correcting the pitch in the same manner with inner link plates of a non-guide row which includes no guide link plate by applying a pre-load exerting a tensile load greater than a yield load after assembling the chain.

In the silent chain of the first embodiment, the guide link plate is formed of the low rigid type plate having the crotch portion, and the ear portions thereof serve as the abut portions which abut against the chain guide. Still further, the ear portion of the guide link plate is provided with the flat face and serves as the apex portion of the abut portion, so that the flat surface can assure an area of contact with the chain guide and stably guides the silent chain while blocking quick abrasion of the ear portion and the chain guide due to the slidable contact therebetween.

In the silent chain of the second embodiment, because each guide link plate is the washer type guide link plate, it is possible to lighten the silent chain and to change position of contact with the chain guide by rotating the guide link plate formed of the washer depending on a condition.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-256915, filed on Nov. 22, 2012, which is hereby incorporated by reference herein in its entirety.

What is claimed is:

1. A silent chain, comprising:
    inner link plates each having a pair of teeth, a pair of pin holes, and a back face curved convexly, the inner link plates being arrayed in widthwise and longitudinal directions of the chain;
    guide link plates each having a pin hole and an abut portion formed on a back face thereof at a position corresponding to the pin hole, the guide link plates being disposed at both outer sides of the inner link plates arrayed in the width direction; and
    pins retained by the pin holes of the guide link plates and inserted through the pin holes of the inner link plates such that the inner link plates adjacent in the longitudinal direction are articulably and endlessly connected;
    wherein a length from a line connecting centers of the pin holes to a convex apex portion of the back face of each inner link plate is substantially equal to a length from the line to an apex portion of the abut portion of each guide link plate.

2. The silent chain according to claim 1, wherein the convex apex portion of each inner link plate is formed at a center between the pair of pin holes; and
    wherein the convex apex portions of the inner link plates are formed per every pitch which is a distance between the pair of pin holes, and the apex portions of the abut portions of the guide link plates are formed per every pitch at a center between the adjacent convex apex portions.

3. The silent chain according to claim 2, wherein each guide link plate is of a low rigidity type plate including:
    the pair of pin holes;
    a crotch portion formed on the back face at a center between the pin holes; and
    ear portions formed on both sides in the longitudinal direction of the crotch portion and being the abut portions.

4. The silent chain according to claim 3, wherein each ear portion has a flat face which is shorter than a diameter of the pin and is in parallel with the line connecting the centers of the pin holes, and
    wherein the flat face is the apex portion of the abut portion.

5. The silent chain according to claim 4, wherein surface roughness of the convex apex portion of the inner link plate is lower than that of the apex portion of the abut portion of the guide link plate.

6. The silent chain according to claim 5, wherein a thickness of the guide link plate is thinner than a thickness of the inner link plate.

7. The silent chain according to claim 2, wherein each guide link plate has only one pin hole and is a washer type guide link plate ringed centering on the pin hole, and
    wherein a part of the back face of the guide link plate on the back face side of the pin hole is the abut portion.

8. The silent chain according to claim 7, wherein surface roughness of the convex apex portion of the inner link plate is lower than that of the apex portion of the abut portion of the guide link plate.

9. The silent chain according to claim 1, wherein each guide link plate is of a low rigidity type plate including:
    the pair of pin holes;
    a crotch portion formed on the back face at a center between the pin holes; and
    ear portions formed on both sides in the longitudinal direction of the crotch portion and being the abut portions.

10. The silent chain according to claim 9, wherein each ear portion has a flat face which is shorter than a diameter of the pin and is in parallel with the line connecting the centers of the pin holes, and wherein the flat face is the apex portion of the abut portion.

11. The silent chain according to claim 1, wherein each guide link plate has only one pin hole and is a washer type guide link plate ringed centering on the pin hole, and wherein a part of the back face of the guide link plate on the back face side of the pin hole is the abut portion.

12. The silent chain according to claim 1, wherein surface roughness of the convex apex portion of the inner link plate is lower than that of the apex portion of the abut portion of the guide link plate.

13. The silent chain according to claim 1, wherein a thickness of the guide link plate is thinner than a thickness of the inner link plate.

14. A silent chain transmission, comprising:

a silent chain as described in claim 1;

driving and driven sprockets around which the silent chain is wrapped; and a chain guide that is in slidable contact with the back face of the silent chain to guide the silent chain;

wherein the convex apex portion of the inner link plate and the apex portion of the abut portion of the guide link plate are brought in slidable contact with a guide face of the chain guide.

\* \* \* \* \*